Figure 1:
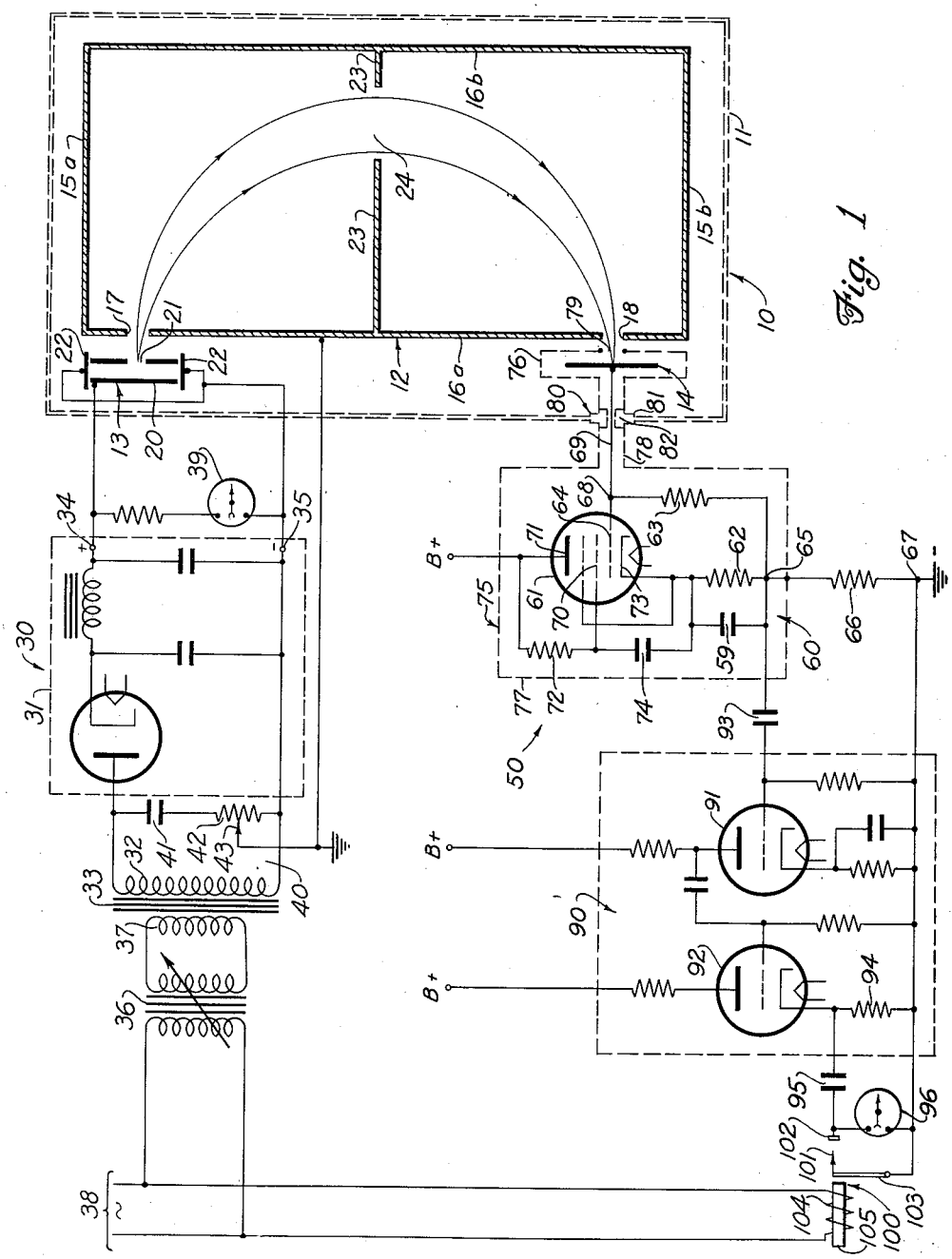

April 8, 1952     W. R. BAKER     2,591,998

LEAK DETECTOR

Filed July 29, 1947

INVENTOR.
WILLIAM R. BAKER
BY
*Robert A. Lavender*
ATTORNEY

Patented Apr. 8, 1952

2,591,998

UNITED STATES PATENT OFFICE 2,591,998

LEAK DETECTOR

William R. Baker, Berkeley, Calif., assignor to the United States of America as represented by the United States Atomic Energy Commission Application July 29, 1947, Serial No. 764,519

3 Claims. (Cl. 250—41.9)

This invention relates to a gas-leak detector and more particularly to a gas-leak detector of the mass spectrometer type utilizing an indicator gas to evidence the presence and location of a leak in an evacuated vessel.

In the copending application, Serial No. 758,509 by Dr. John G. Backus, there is described a vacuum analyzer of the mass spectrometer type which may be utilized as a leak detector to locate leaks in the walls of an evacuated vessel. The location and detection of such leaks is facilitated by movement of an exploratory hose over the exterior surface of the evacuated vessel undergoing test while the hose is slowly expelling a jet of indicator gas such as helium. The vacuum analyzer which comprises an ion generating source and a spectrometer chamber positioned within an electromagnetic field, communicates with the interior of the evacuated vessel undergoing test and is dependent in its operation upon the gas molecules present within said vessel. The introduction of indicator gas molecules into the interior through some fissure in the tank envelope, at the approach of the exploratory hose in the vicinity of said fissure, will be evidenced by a sudden increase in the height of the signal peak on the screen of the cathode ray tube corresponding to the indicator gas, thereby indicating the presence of a leak at that position.

The present invention is an improved gas-leak detector of the Backus type and involves an electric circuit for periodically directing ions corresponding to the indicator gas onto the ion receiver and for amplifying the resulting periodic current thereby providing a device of great sensitivity. Moreover, the presence of a gas-leak ascertained by the described exploratory hose technique is, in this invention, evidenced by a meter indication.

It is, therefore, an object of the invention to provide a gas-leak detector of great sensitivity to indicate the locations of leaks through the envelope of an enclosed vessel such as an evacuated tank.

A further object of the invention is to provide an electric circuit which will periodically sweep the ion beam corresponding to the indicator gas back and forth across the receiver input slot of a mass spectrometer in synchronism with the operation of a vibrator type intermittent contact switch in such manner that the detected and amplified energy initiated by the ion beam is available to the metering instrument only while the ion beam is directed through the receiver slot and impinging onto the receiver.

A further object of the invention is to provide electrical means for directing ions of a selected mass-to-charge ratio upon the receiver input element.

A further object of the invention is to provide means for shifting the phase of the A. C. component of the ion accelerating voltage with respect to the operation of a vibrator type switch.

Other objects and advantages of the invention will be apparent in the following description and claims considered together with the accompanying drawing in which:

Figure 1 is a schematic representation of the elements embodying the invention.

Referring to Fig. 1, there is illustrated a mass spectrometer 10 of the Backus type, an ion control voltage supply 30 and an ion current amplifier 50. The mass spectrometer 10 is arranged within an evacuated tank 11 under test. A substantially homogeneous magnetic field having a direction normal to the sheet of the drawing passes through the mass spectrometer 10. The mass spectrometer 10 includes a beam shield 12, an ion source 13, and a receiver 14. The beam shield 12 has a rectangular cross section in a plane transverse to the magnetic field and preferably has a length about twice its width. The shield 12 is provided with end walls 15a and 15b and side walls 16a and 16b. One side wall 16a of the shield 12 includes two slots, a source slot 17 and a receiver slot 18 each aligned with the magnetic field, these slots being substantially equally spaced from the respective adjacent end walls 15a and 15b of the shield 12.

The ion source 13 is of the cold cathode type and is located externally of the shield 12 adjacent the source slot 17. The ion source 13 comprises a metallic cylindrical anode 20 having a slot 21 therein, said slot being parallel to the axis of cylinder 20 in substantial register with similar source slot 17 in the shield 12. It will be understood that in the schematic representation of the source 13, the latter has been rotated 90° about an axis bisecting its longitudinal dimension and normal to its axis. Ion source 13 is also comprised of a pair of cathodes 22, 22 arranged on the axis of the anode 20 and at opposite ends thereof. The two cathodes 22, 22 are electrically connected and are spaced from the anode 20. With this arrangement and with the cathodes 22, 22 at a potential that is negative relative to the anode 20, free electrons existing within the ion source 13 accelerate to and fro along the magnetic field between the cathodes 22, 22 and thus ionize neutral gas molecules existing within the ion source 13.

The ion receiver 14 is arranged externally of and parallel to the side wall 16a of the beam shield 12 opposite the receiver slot 18 and is insulated from the beam shield 12. Two beam defining plates 23, 23 attached to the side walls 16a and 16b, project inwardly of the shield 12 along the line parallel to the end plates 15a and 15b, midway between the source slot 17 and the receiver slot 18. These plates 23, 23 define the limits of an ion beam that is projected from the source slot 17 to the receiver slot 18. The slot 21 of the ion source 13, the two slots 17 and 18 in the shield 12, the beam defining opening 24 in the shield between the plates 23, 23 and the receiver 14 are all arranged at the periphery of a crescent pattern in a common plane transverse to the magnetic field.

The ion control voltage supply 30 includes a rectifier 31 having its input connected across the secondary winding 32 of a step-up supply transformer 33 and its output connected between the anode 20 and the pair of cathodes 22, 22 of the ion source 13, the positive terminal 34 of the rectifier 31 output being connected to the anode 20 and the negative terminal 35 being connected to the cathodes 22, 22.

A variable transformer 36 of conventional type is connected between the primary 37 of the step-up voltage transformer 33 and the A. C. supply 38. A voltmeter 39 is connected across the output of the rectifier 31. By adjusting the variable transformer 36 and reading the voltage produced at the output of the rectifier 31 as indicated by the voltmeter 39, ions of selected mass-to-charge ratio are focused upon the receiver 14 as more fully explained hereinafter.

A phase shifting network 40 comprising a condenser 41 and a variable resistance 42 is connected in series across the secondary 32 of the transformer 33. A grounded slider 43 of resistor 42 is connected to the shield 12 causing a fluctuating unidirectional electric field to be produced between the shield 12 and the anode 20. This unidirectional voltage is equal to the sum of the D. C. output of the rectifier 31 and the A. C. potential existing across the portion of the resistor 42 between the cathodes 22, 22 and ground. The purpose of the phase shifting network will also be more fully described hereinafter.

The amplifier 50 comprises two stages 60 and 90. The first or input stage 60 is a high gain, low time constant D. C. amplifier having a high effective input impedance. The second or output stage 90 is a high gain alternating current amplifier. The input 60 of the amplifier 50 is connected to the ion receiver 14 and the output 90 is applied to a voltmeter 96 which indicates the beam intensity.

The input stage 60 comprises a self-biased high gain pentode 61, the bias being provided by the potential drop through a cathode resistor 62 which is shunted by a by-pass condenser 59. It also includes a large input resistor 63 connected between the signal grid 64 of the pentode 61 and a junction point 65 at the negative end of the bias resistor 62. It also includes an output resistor 66 connected in series with the bias resistor 62 between said junction point 65 and ground 67. The common junction 68 between the signal grid 64 and the grid input resistor 63 is connected to the ion receiver 14 by means of a conductor 69 passing through a vacuum and electrical insulating seal 80 in the tank wall 11. The screen grid 70 of the pentode 61 is connected to the anode 71 through a dropping resistor 72 and is coupled to the cathode 73 through a condenser 74. An electrostatic shield 75 encloses all of the input stage 60 except the load resistor 66 and the battery (not shown) which supplies voltage to the anode 71. This electric shield 75 comprises first and second metal members 76 and 77 respectively and a communicating metal member 78. The first metal member 76 encloses the receiver 14 except for a slot 79 therein arranged between the receiver slot 18 of the beam shield 12 and the receiver 14 itself. The second metallic member 77 encloses the pentode 61, the input resistor 63, the bias resistor 62, the by-pass condenser 59, the screen resistor 72, and the condenser 74. The communicating member 78 is arranged coaxially with the conductor 69 connecting the receiver 14 and the signal grid 64. This communicating member 78 and the conductor 69 pass through a seal 80 in the tank wall 11. This seal includes an annular insulating portion 81 arranged between the tank wall 11 and the communicating member 78 and a second annular insulating portion 82 arranged between this member 78 and the conductor 69. The electrostatic shield 75 is electrically connected to the common junction 65 between the input resistor 63, the output resistor 66, and the bias resistor 62.

The output stage 90 comprises first and second triodes 91 and 92 respectively arranged in tandem amplifying relation. The first triode 91 is coupled in conventional manner by means of a condenser 93 to the output resistor 66 of the input stage 60. The second triode 92 is loaded in the cathode circuit by means of a resistor 94. A signal appearing across this resistor 94 is communicated through a condenser 95 to the voltmeter 96.

A vibrator 100 is provided for periodically shorting out the voltmeter 96. This vibrator 100 is of the type known as a Brown converter which is manufactured by the Minneapolis Honeywell Manufacturing Corporation. It comprises a pair of contacts 101 and 102, one of which, 101, is mounted upon a pivoted armature 103 in the form of a permanent magnet and also includes an actuating coil 104 and an associated iron core 105, the coil 104 being connected to the source 38 of alternating current power. The polarity of the iron core electromagnet enclosed by the actuating coil 104 alternates at the frequency of the A. C. source voltage. The magnetic fields of the electromagnet and the permanent magnet type armature 103 interact to impart alternating attractive and repulsive forces on the armature with respect to the iron core electromagnet, thereby making and breaking contact points 101 and 102 at the frequency of the A. C. source voltage. The pivoted contact 101 is grounded and the other contact 102 is connected to the junction point between the condenser 95 and the voltmeter 96.

Under the influence of the electric field between the ion source 13 and the shield 12 positive ions are projected from the interior of the ion source 13 through the slot 21 in the anode 20 and through the source slot 17 in the shield 12 and through the beam defining opening 24 within the beam shield 12 and through the receiver slot 18 in the shield 12 onto the receiver 14, in accordance with the formula:

$$\frac{m}{e} = \frac{r^2 H^2}{2V}$$

Where $H$ = strength of the magnetic field;

$V$ = the accelerating voltages to which the ions are subjected;

$r$ = the radius of curvature of the paths along which the ions are projected; and $m/e$ = the mass-to-charge ratio of the positive ions projected along those paths from the ion source to the receiver.

By adjusting the variable transformer 36 and the position of the slider 43, the ion accelerating field applied between the ion source 13 and the shield 12 is adjusted to such a condition that ions of only a selected mass-to-charge ratio are focused upon the receiver 14 and the beam including these ions is swept back and forth across the receiver slot 18 by virtue of the A. C. component therein. Preferably the magnitudes of the D. C. component and the A. C. component of the ion accelerating field thus produced are so proportioned that the selected ion beam passes through the receiver slot 18 during part of the time and falls upon the wall 16a of the beam shield 12 during the remaining time, the two times preferably being about equal. In practice the values of the D. C. component and the A. C. component of the ion accelerating voltage are adjusted to such values that a beam of selected ions is swept back and forth over a range having one extremity within the receiver slot 18 in the shield 12 and the other extremity on one side or the other of this slot 18. Thus by adjusting the ion accelerating voltage in the manner described an alternating current is produced through the input resistor 63 of the amplifier 50, of the same frequency as that of the power supply and of an amplitude substantially proportional to the intensity of the selected ion beam. This alternating current potential is amplified in the pentode 61 to produce a higher voltage across the load resistor 66. This amplified voltage is then transmitted through the condenser 93 to the second stage 90 of the amplifier 50 and thence to the voltmeter 96.

By properly adjusting the phase relation of the A. C. component of the ion accelerating voltage to the operation of the vibrator 100, it is possible to cause the contacts 101 and 102 of the vibrator 100 to open during the time that ions are striking the receiver 14 and to close when the ions are striking upon the wall 16a of the beam shield 12. It has been found that when using a vibrator of the type referred to and an amplifier having substantially no phase shift, a 90° phase shift in the RC combination 43 and 41 will bring the operation of the vibrator 100 and the beam accelerating voltage into the desired synchronism. When so synchronized the output meter 96 is responsive to the output of the A. C. amplifier 50 during the time that the ion beam is impinging upon the receiver 14 and is shorted out at other times. By utilizing a voltmeter 96 having a long time constant compared to the period of the alternating currents in question a stationary reading is obtained. It is to be noted that the coupling condenser 95 effectively blocks any D. C. component of voltage from influencing the meter 96, thus the meter system as disclosed needs no zero adjustment as all drift is eliminated. Thus, by properly synchronizing the vibrator with the mass spectrometer, random frequency signals comprising the background noise are excluded from the meter and the meter by virtue of the long time constant thereof only indicates the summation of the desired signals. By this means a very minute amount of a particular element may be detected by the apparatus without regard to the magnitude of extraneous signals arising either in the mass spectrometer itself or in the circuits associated therewith.

The arrangement described has the advantage of being simple and compact and of providing high ion beam amplification and a high signal to noise ratio.

Although this invention has been described with reference to a particular embodiment thereof, it is not limited to this embodiment nor otherwise except by the terms of the following claims.

What is claimed is:

1. A leak detector comprising a mass spectrometer including an ion generating source, said source being disposed opposite an ion access aperture positioned in the ion baffle surface of said spectrometer, an ion beam receiver positioned opposite an ion egress aperture in said baffle surface, an amplifier connected to said receiver and having at its output an indicator, means whereby an ion beam of said spectrometer is caused to sweep periodically back and forth along said baffle surface and across said ion egress aperture, said beam thereby periodically impinging upon said receiver, a shunt circuit about said indicator, and means in said shunt circuit for opening and closing said circuit in synchronism with said periodically impinging ion beam, whereby said indicator is rendered operative and inoperative in synchronism with said beam.

2. A leak detector comprising a mass spectrometer including an ion generating source, said source and an ion receiver being disposed opposite an ion access aperture in the ion baffle surface of said spectrometer, an amplifier connected to said receiver, an indicator connected to said amplifier output, a source of line voltage having a high voltage power supply connected thereto for applying to the anode of said ion source a resultant voltage having a D. C. potential which is positive in sign relative to said spectrometer and includes also an A. C. voltage component, whereby the ion beam is periodically swept across the receiver, phase shift means for varying the phase of said A. C. voltage component relative to said line voltage an amount equal to the time lag between the ion beam emerging from the ion source and the corresponding output signal from the receiver amplifier, a shunt circuit about said indicator, and disconnect means in said shunt circuit synchronized with said source of line voltage, whereby said shunt circuit is opened and the meter thus rendered operative only when the output from said amplifier is the amplified signal from the ion beam impinging upon said receiver.

3. A leak detector comprising a mass spectrometer including an ion generating source and an ion receiver, said source being disposed opposite an ion access aperture in the ion baffle of said spectrometer, an amplifier connected to said receiver, a meter having a long time constant for indicating the current at said receiver, a shunt circuit connected about said meter, a vibrator connected in said shunt circuit, a source of A. C. voltage, means connecting said A. C. voltage source to said vibrator whereby said indicator is periodically short circuited by said shunt circuit in synchronism with said A. C. voltage, a voltage transformer connected to said A. C. voltage source for producing a high voltage, a rectifier connected to said transformer for converting said A. C. high voltage to D. C. high voltage, means connecting said rectifier between said ion source and said ion baffle surface to accelerate ions from said source, an adjustable phase shift network connected to said transformer for shifting the phase thereof an amount equal to the time lag between ions expelled from said source and current received at said indicator, means for applying an adjustable fraction of said phase shifted A. C. voltage between said ion source and said ion baffle surface whereby a predetermined ion beam from said ion source periodically impinges said receiver, and said indicator is synchronously rendered operative and inoperative to indicate only ions of a predetermined mass-charge ratio impinging said receiver.

WILLIAM R. BAKER.

REFERENCES CITED

The following references are of record in the file of this patent:

UNITED STATES PATENTS

| Number | Name | Date |
| --- | --- | --- |
| 1,923,252 | Brolly | Aug. 22, 1933 |
| 2,287,808 | Lehde | June 30, 1942 |
| 2,370,673 | Langmuir | Mar. 6, 1945 |
| 2,380,439 | Hoskins et al. | July 31, 1945 |
| 2,442,298 | Liston | May 25, 1948 |
| 2,457,162 | Langmuir | Dec. 28, 1948 |

FOREIGN PATENTS

| Number | Country | Date |
| --- | --- | --- |
| 457,415 | Great Britain | Nov. 27, 1936 |